United States Patent
Kumar et al.

(10) Patent No.: US 12,347,423 B2
(45) Date of Patent: Jul. 1, 2025

(54) METHOD AND SYSTEMS FOR DECODING AN AUDIO QUERY

(71) Applicant: SAMSUNG ELECTRONICS CO., LTD., Suwon-si (KR)

(72) Inventors: Ankur Kumar, Bengaluru (IN); Shatrughan Singh, Bengaluru (IN); Aman Maghan, Bengaluru (IN); Ashutosh Gupta, Bengaluru (IN); Sachin Singh, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 232 days.

(21) Appl. No.: 17/692,893

(22) Filed: Mar. 11, 2022

(65) Prior Publication Data

US 2022/0223143 A1    Jul. 14, 2022

Related U.S. Application Data

(63) Continuation of application No. PCT/KR2021/019279, filed on Dec. 17, 2021.

(30) Foreign Application Priority Data

Dec. 18, 2020  (IN) .............................. 202041055264
Sep. 14, 2021  (IN) .............................. 202041055264

(51) Int. Cl.
*G10L 15/197*  (2013.01)
*G06F 40/166*  (2020.01)
(Continued)

(52) U.S. Cl.
CPC .......... *G10L 15/197* (2013.01); *G06F 40/166* (2020.01); *G10L 15/02* (2013.01);
(Continued)

(58) Field of Classification Search
CPC ....... G10L 15/197; G10L 15/02; G10L 15/04; G10L 15/22; G06F 40/166
See application file for complete search history.

(56) References Cited

U.S. PATENT DOCUMENTS 7,617,188 B2 *  11/2009  Hu .................. G06F 16/683
8,352,273 B2     1/2013   Nakano
(Continued)

FOREIGN PATENT DOCUMENTS

JP    2019-207371 A     12/2019
KR    10-2020-0082137 A  7/2020
WO    2020/208972 A1    10/2020

OTHER PUBLICATIONS

International Search Report (PCT/ISA/210) dated Mar. 30, 2022 issued by the International Searching Authority in International Application No. PCT/KR2021/019279.
(Continued)

*Primary Examiner* — Richemond Dorvil
*Assistant Examiner* — Ethan Daniel Kim
(74) *Attorney, Agent, or Firm* — Sughrue Mion, PLLC

(57) ABSTRACT

A method for decoding an audio query may include: extracting one or more acoustic features from the audio query in response to receiving the audio query from a user; determining a generic word and a domain specific word based on the one or more acoustic features; and decoding the audio query based on the generic word, the domain specific word, and the one or more acoustic features to identify at least one word associated with the audio query.

16 Claims, 14 Drawing Sheets

(51) Int. Cl.
  *G10L 15/02* (2006.01)
  *G10L 15/04* (2013.01)
  *G10L 15/22* (2006.01)

(52) U.S. Cl.
  CPC .............. *G10L 15/04* (2013.01); *G10L 15/22* (2013.01); *G10L 2015/223* (2013.01)

(56) References Cited

U.S. PATENT DOCUMENTS

| | | | |
|---|---|---|---|
| 8,386,262 B2 | 2/2013 | Bangalore et al. | |
| 9,378,742 B2 | 6/2016 | Kim | |
| 9,953,648 B2 | 4/2018 | Choi et al. | |
| 10,121,467 B1 | 11/2018 | Gandhe et al. | |
| 10,468,019 B1 | 11/2019 | Pemba et al. | |
| 2005/0071170 A1 | 3/2005 | Comerford | |
| 2005/0182628 A1 | 8/2005 | Choi | |
| 2010/0241256 A1* | 9/2010 | Goldstein ................ | H04R 5/04 700/94 |
| 2011/0078127 A1* | 3/2011 | Lin .......................... | H04L 67/01 707/706 |
| 2013/0289988 A1 | 10/2013 | Fry | |
| 2015/0019216 A1 | 1/2015 | Singh et al. | |
| 2015/0032443 A1 | 1/2015 | Karov et al. | |
| 2015/0058018 A1 | 2/2015 | Georges et al. | |
| 2017/0365251 A1 | 12/2017 | Park et al. | |
| 2018/0032884 A1 | 2/2018 | Murugeshan et al. | |
| 2018/0218728 A1 | 8/2018 | Manuvinakurike et al. | |
| 2018/0330728 A1* | 11/2018 | Gruenstein ......... | H04L 63/1458 |
| 2020/0034430 A1* | 1/2020 | Hoshino ................ | G06F 16/00 |
| 2020/0160838 A1 | 5/2020 | Lee | |
| 2020/0184570 A1 | 6/2020 | Indyk et al. | |
| 2020/0327884 A1 | 10/2020 | Bui et al. | |
| 2020/0335108 A1* | 10/2020 | Meng ..................... | G06N 3/045 |
| 2020/0342057 A1 | 10/2020 | Boekweg | |
| 2021/0050016 A1 | 2/2021 | Kim et al. | |
| 2021/0050017 A1 | 2/2021 | Kim et al. | |
| 2021/0343277 A1 | 11/2021 | Jaber et al. | |
| 2022/0093097 A1 | 3/2022 | Jin et al. | |
| 2022/0157293 A1 | 5/2022 | Fujita | |

OTHER PUBLICATIONS

Written Opinion (PCT/ISA/237) dated Mar. 30, 2022 issued by the International Searching Authority in International Application No. PCT/KR2021/019279.
Communication issued Jul. 18, 2022 by the Indian Patent Office in Indian Patent Application No. 202041055264.
Communication dated Jan. 23, 2024, issued by the European Patent Office in counterpart European Application No. 21907155.2.
Communication dated Feb. 1, 2024, issued by the INDIA Intellectual Property Office in Indian Patent Application No. 202041055264.
Communication issued Feb. 12, 2025 by the European Patent Office for EP Patent Application No. 21907155.2.

* cited by examiner

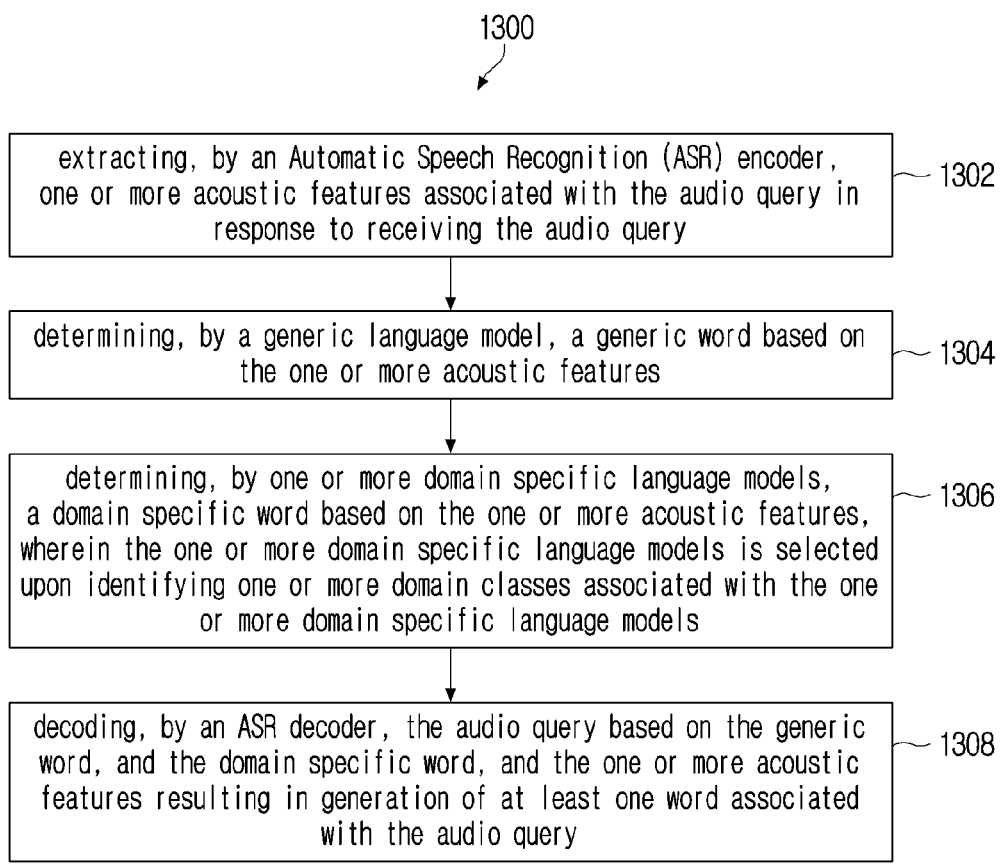

METHOD AND SYSTEMS FOR DECODING AN AUDIO QUERY

CROSS-REFERENCE TO RELATED APPLICATION(S)

This application is a by-pass continuation of PCT International Application No. PCT/KR2021/019279, filed on Dec. 17, 2021, and is based on and claims priority under 35 U.S.C. § 119 to Indian Patent Application No. 202041055264 filed on Dec. 18, 2020, in the Indian Intellectual Property Office, and Indian Patent Application No. 202041055264 filed on Sep. 14, 2021, in the Indian Intellectual Property Office, the disclosures of which are incorporated by reference herein in their entireties.

BACKGROUND

1. Field

The present disclosure relates to automatic speech recognition, and in particular, relates to systems and methods for decoding an audio query.

2. Description of Related Art

Traditional voice-based virtual assistants have become ubiquitous with the virtual assistants being deployed to multiple devices. Automatic Speech Recognition (ASR) enables these virtual assistants, where natural-language understanding (NLU) components utilize an ASR output to process a user query. Therefore, accuracy of an ASR system becomes critical in the success of voice-based virtual assistants. Also, there is an increasing demand for use cases like voice typing, where latency involved should be as low as possible, and for different available user context information to improve speech recognition accuracy like speaker accent, gender, age etc.

Incorporating external information in the form of "type of user query", which is called a domain, has also resulted in significant improvements in ASR. Domains can be music, contact or similar information which is generally present on a user device or can be identified from a query itself in order to bias an ASR output. Traditionally, domain-specific external information has been used in the form of domain-specific statistical language models (LMs). Domain class is obtained from the ASR output (which does not involve any domain-LM) using a multi-class classifier that processes a text input. This is the first-pass decoding process for ASR systems. Domain-LMs are used in further passes to refine the ASR output, which results in improved ASR hypothesis.

The traditional embodiments have many problems: a) Multiple passes after the first pass of ASR decoding increases the latency of the entire process, thereby making it difficult to use in scenarios such as voice typing b) Not using domain-LMs in the first pass ASR decoding makes the output of first pass as well as the subsequent pass(es) suboptimal c) Domain classification is also suboptimal as it utilizes the first pass ASR output, which may contain errors.

Thus, there is a need for a solution that overcomes the above technical disadvantages.

SUMMARY

According to an aspect of the present disclosure, a method for decoding an audio query, may include: extracting one or more acoustic features from the audio query in response to receiving the audio query from a user; determining a generic word and a domain specific word based on the one or more acoustic features; and decoding the audio query based on the generic word, the domain specific word, and the one or more acoustic features to identify at least one word associated with the audio query.

The method may further include: processing the at least one word to perform an operation associated with the audio query.

The method may further include: converting the audio query into one or more segments to represent the audio query as one or more numbers per segment; generating one or more summary vectors in a textual domain by combining the one or more segments, wherein the one or more summary vectors are numerical representations of the audio query; determining an audio vector associated with the audio query from the one or more summary vectors; and identifying one or more domain classes associated with the audio query based on the audio vector associated with the audio query.

The generic word and the domain specific words may be determined in parallel.

The decoding the audio query may include: receiving a last predicted word associated with an automatic speech recognition (ASR) decoder, the generic word and the domain specific word; selecting one or more summary vectors including an audio vector for a word that follows the last predicted word; and predicting the at least one word associated with the audio query based on the last predicted word, the generic word, the domain specific word, and the one or more summary vectors associated with the audio vector.

The method may further include: identifying, from a plurality of words, the at least one word that has a probability value higher than probabilities values of other words, wherein the probability value is determined based on a weight value associated with a generic language model, a domain specific language model, and an automatic speech recognition (ASR) decoder that performs the decoding of the audio query.

The method may further include: selecting one or more domain specific language models based on a probability of each of the one or more domain specific language models being related to each of one or more domain classes, wherein the determining the domain specific words may include: determining the domain specific words using the selected one or more domain specific language models.

According to another aspect of the present disclosure, an electronic device for decoding an audio query may include: a memory storing one or more instructions; and at least one processor configured to execute the one or more instructions to: extract one or more acoustic features from the audio query in response to receiving the audio query from a user; determine a generic word and a domain specific word based on the one or more acoustic features; and decode the audio query based on the generic word, the domain specific word, and the one or more acoustic features to identify at least one word associated with the audio query.

The at least one processor may be further configured to: process the at least one word to perform an operation associated with the audio query.

The at least one processor may be further configured to: convert the audio query into one or more segments to represent the audio query as one or more numbers per segment; one or more summary vectors in a textual domain by combining the one or more segments via a plurality of Long Short-Term Memory (LSTM) architectures, wherein the one or more summary vectors are numerical representations of the audio query; determining an audio vector associated with the audio query from the one or more summary vectors; and identifying one or more domain classes associated with the audio query based on the audio vector associated with the audio query.

The at least one processor may be further configured to: determine the generic word and the domain specific word in parallel.

The at least one processor may be further configured to: receive a last predicted word associated with an automatic speech recognition (ASR) decoder, the generic word and the domain specific word; select one or more summary vectors including an audio vector for a word that follows the last predicted word; and predict the at least one word associated with the audio query based on the last predicted word, the generic word, the domain specific word, and the one or more summary vectors associated with the audio vector.

The at least one processor may be further configured to: identify, from a plurality of words, the at least one word that has a probability value higher than probabilities values of other words, wherein the probability value is determined based on a weight value associated with a generic language model, a domain specific language model, and an automatic speech recognition (ASR) decoder.

The at least one processor may be further configured to: select one or more domain specific language models based on a probability of each of the one or more domain specific language models being related to each of one or more domain classes; and determine the domain specific words using the selected one or more domain specific language models.

According to another aspect of the present disclosure, a non-transitory computer-readable storage medium storing a program is executable by at least one processor to perform a method of processing an audio signal, the method including: extracting one or more acoustic features from the audio query in response to receiving the audio query from a user; determining a generic word and a domain specific word based on the one or more acoustic features; and decoding the audio query based on the generic word, the domain specific word, and the one or more acoustic features to identify at least one word associated with the audio query.

The method may further include: converting the audio query into one or more segments to represent the audio query as one or more numbers per segment; generating one or more summary vectors in a textual domain by combining the one or more segments, wherein the one or more summary vectors are numerical representations of the audio query; determining an audio vector associated with the audio query from the one or more summary vectors; and identifying one or more domain classes associated with the audio query based on the audio vector associated with the audio query.

The method may further include: receiving a last predicted word associated with an automatic speech recognition (ASR) decoder, the generic word and the domain specific word; selecting one or more summary vectors including an audio vector for a word that follows the last predicted word; and predicting the at least one word associated with the audio query based on the last predicted word, the generic word, the domain specific word, and the one or more summary vectors associated with the audio vector.

The presented approach solves the technical problems by adding a neural domain classifier module to the ASR system. The module works on the acoustic signal directly to identify the domain class as opposed to utilizing the ASR text output for the process. The output of domain classifier module enables domain-LM selection module, which is then used with the ASR decoding process to incorporate external domain information in the first pass itself.

BRIEF DESCRIPTION OF THE DRAWINGS

The above and/or other aspects will be more apparent by describing certain example embodiments, with reference to the accompanying drawings, in which:

FIG. 13 illustrates a schematic block diagram depicting a method for decoding an audio query, in accordance with embodiment of the present disclosure.

DETAILED DESCRIPTION

Figure 1:
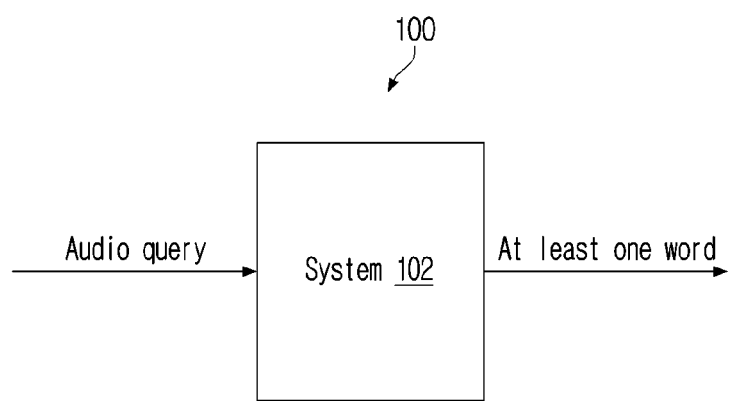
FIG. 1 illustrates an environment including a system for decoding an audio query, in accordance with an embodiment of the present disclosure.

Embodiments of the present disclosure are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

FIG. 1 illustrates an environment 100 including a system 102 for decoding an audio query, in accordance with an embodiment of the present disclosure. In an embodiment, the audio may be decoded by the system 102 in a single pass based on an Automatic Speech Recognition (ASR) technique. The system 102 may include one or more processors that uses a neural network model. In an embodiment, upon decoding the audio query, the system 102 may perform an operation related to the audio query upon processing at least one word decoded from the audio query. In an embodiment, the processing may be based on a Natural Language Understanding (NLU) technique. In an embodiment, the system 102 may be configured to receive the audio query from a user.

According to embodiments of the present disclosure, the system 102 may be configured to extract one or more acoustic features associated with the audio query in response to receiving the audio query. In response to extracting the one or more acoustic features from the audio query, the system 102 may determine a generic word from the audio query. In an embodiment, the generic word may be determined based on the one or more acoustic features extracted from the audio query.

The system 102 may be configured to determine a domain specific word from the audio query. In an embodiment, the domain specific word may be determined based on the one or more acoustic features. In an embodiment, the domain specific word may further be based on one or more domain classes identified within the system 102.

The term "domain specific word" may refer to a word that is used primarily within one area (or domain) of knowledge but not others. A domain specific word may be understood by people in the corresponding domain (e.g., medicine), and may not be understood by outsiders. Examples of areas or domains of knowledge may include music, history, chemistry, mathematics, literature, medicine and the like. The term "generic word" may refer to a word that is used and understood by lay people without having domain knowledge.

In an embodiment, the generic word and the domain specific words are determined in parallel Upon determining the domain specific word, the system 102 may decode the audio query. In an embodiment, the audio query may be decoded based on the generic word, the domain specific word, and the one or more acoustic features related to the audio query. In an embodiment, decoding the audio query may result in generation of the at least one word associated with the audio query.

Figure 2:
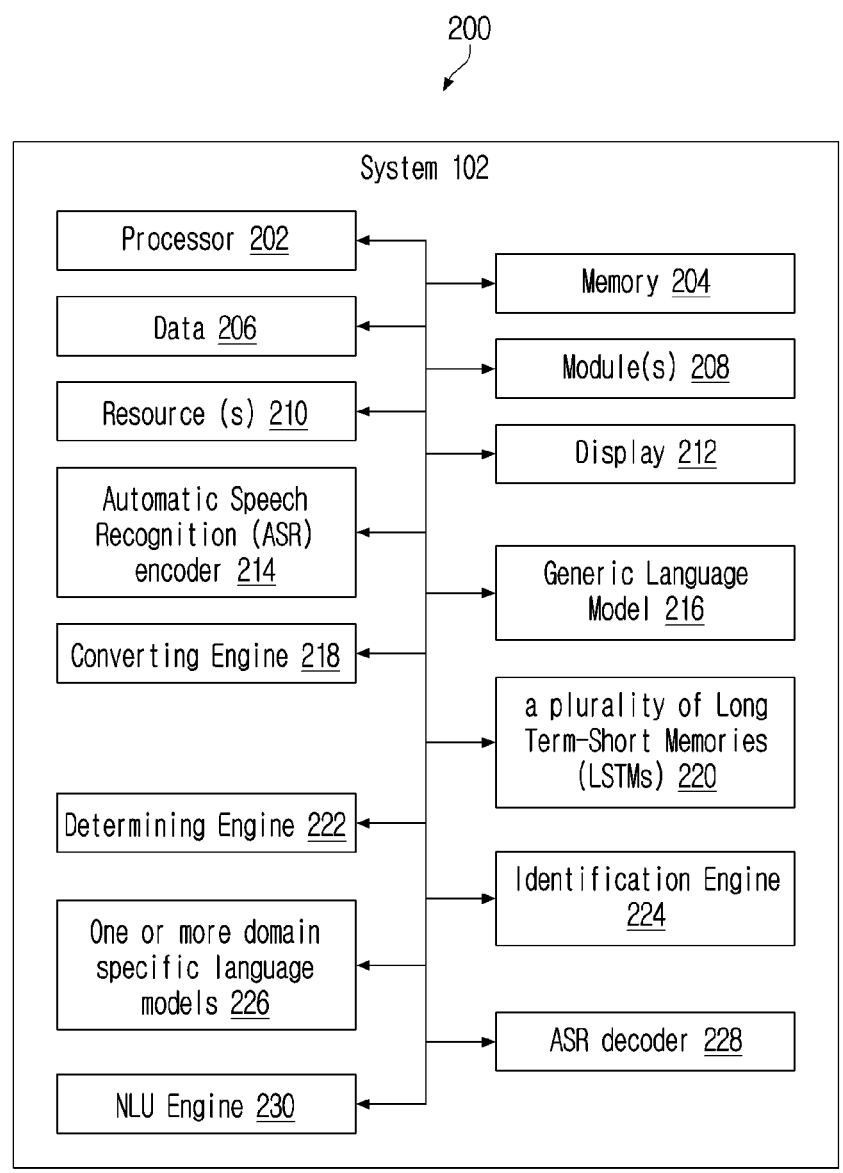
FIG. 2 illustrates a schematic block diagram of a system for decoding an audio query, in accordance with an embodiment of the present disclosure.

FIG. 2 illustrates a schematic block diagram 200 of the system 102 for decoding an audio query, in accordance with an embodiment of the present disclosure. In an embodiment, the system 102 may be configured to decode the audio query for generating at least one word associated with audio query. Furthermore, the system 102 may be configured to process the at least one word to determine an action to be executed related to the audio query. In an embodiment, the system 102 may be configured to decode the audio query upon identifying one or more domain classes. In an embodiment, the system 102 may be configured to decode the audio query in a single pass ASR technique and process the at least word base on a NLU technique. In an embodiment, the system 102 may be operated as a Voice Assistant (VA). In an embodiment, the system 102 may be incorporated in a VA.

The system 102 may include a processor 202, a memory 204, data 206, module(s) 208, resource(s) 210, a display 212, an ASR encoder, 214, a generic language model 216, a conversion engine 218, a plurality of Long Short-Term Memory (LSTM) architectures 220, a determining engine 222, an identification engine 224, one or more domain specific language models 226, an ASR decoder 228, and an NLU engine 230. In an embodiment, the processor 202, the memory 204, the data 206, the module(s) 208, the resource(s) 210, the display 212, the ASR encoder, 214, the generic language model 216, the conversion engine 218, the plurality of LSTM architectures 220, the determining engine 222, the identification engine 224, the one or more domain specific language models 226, the ASR decoder 228, and the NLU engine 230 may be communicably coupled to one another.

The system 102 may be understood as one or more of a hardware, a software, a logic-based program, a configurable hardware, and the like. In an example, the processor 202 may be a single processing unit or a number of units, all of which could include multiple computing units. The processor 202 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 202 may be configured to fetch and/or execute computer-readable instructions and/or data 206 stored in the memory 204.

In an example, the memory 204 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 204 may include the data 206.

The data 206 serves, amongst other things, as a repository for storing data processed, received, and generated by one or more of, the processor 202, the memory 204, the module(s) 208, the resource(s) 210, the display 212, the ASR encoder, 214, the generic language model 216, the conversion engine 218, the plurality of LSTM architectures 220, the determining engine 222, the identification engine 224, the one or more domain specific language models 226, the ASR decoder 228, and the NLU engine 230.

The module(s) 208, amongst other things, may include routines, programs, objects, components, data structures, etc., which perform particular tasks or implement data types. The module(s) 208 may also be implemented as, signal processor(s), state machine(s), logic circuitries, and/or any other device or component that manipulate signals based on operational instructions.

Further, the module(s) 208 may be implemented in hardware, instructions executed by at least one processing unit, for e.g., processor 202, or by a combination thereof. The processing unit may be a general-purpose processor which executes instructions to cause the general-purpose processor to perform operations or, the processing unit may be dedicated to performing the required functions. In another aspect of the present disclosure, the module(s) 208 may be machine-readable instructions (software) which, when executed by a processor/processing unit, may perform any of the described functionalities.

In some example embodiments, the module(s) 208 may be machine-readable instructions (software) which, when executed by a processor/processing unit, perform any of the described functionalities.

The resource(s) 210 may be physical and/or virtual components of the system 102 that provide inherent capabilities and/or contribute towards the performance of the system 102. Examples of the resource(s) 210 may include, but are not limited to, a memory (e.g., the memory 204), a power unit (e.g. a battery), a display (the display 212), etc. The resource(s) 210 may include a power unit/battery unit, a network unit, etc., in addition to the processor 202, and the memory 204.

The display 212 may display various types of information (for example, media contents, multimedia data, text data, etc.) on the system 102. The display 212 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display.

The ASR encoder 214 may be configured to receive the audio query from a user. In response to receiving the audio query, the ASR encoder 214 may be configured to extract one or more acoustic features related to the audio query from the audio query. Examples of the one or more acoustic features include, but are not limited to a pitch, a frequency, an amplitude, a wavelength. In an embodiment, the ASR encoder 214 may be configured to extract one or more acoustic features related to the audio query by based on a Mel Frequency Cepstral Coefficient (MFCC) technique.

Subsequent to extracting the one or more acoustic features, the generic language model 216 may be configured to determine a generic word related to the audio query. In an embodiment, the generic word may be determined based on the one or more acoustic features extracted from the audio query.

The conversion engine 218 may be configured to convert the audio query into one or more segments. In an embodiment, the audio query may be converted into the one or more segments for representing the audio query as one or more numbers per segment.

The plurality of LSTM architectures 220 may be configured to generate a numerical representation of the audio query. In an embodiment, generating the numerical representation may be based on processing the one or more segments. In an embodiment, processing the one or more segments may include combining the one or more segments. Based on combining the one or more segments, the plurality of LSTM architectures 220 may be configured to generate one or more high dimensional summary vectors in a textual domain. In an embodiment, the one or more high dimensional summary vectors may be treated as the numerical representation of the audio query. In an embodiment, the one or more high dimensional summary vectors, and the one or more segments may be the one or more acoustic features related to the audio query. In an embodiment, the plurality of LSTMs 220 may be configured to be applied to the numerical representation related to each of the one or more segments.

In an embodiment, upon generation of the one or more high dimensional summary vectors, the determining engine 222 may determine an audio vector related to the audio query. In an embodiment, the determining engine 222 may be configured to determine the audio vector from the one or more high dimensional summary vectors. In an embodiment, the audio vector may be related to the one or more domain classes.

In response to determining the audio vector by the determining engine 222, the identification engine 224 may identify the one or more domain classes related to the audio query. In an embodiment, identifying the one or more domain classes may be based on extracting relevant information from the audio vector associated with the audio query.

Upon identifying the one or more domain classes, the identification engine 224 may be configured to select the one or more domain specific language models 226 for generating a domain specific word. In an embodiment, the one domain specific language models may be selected based on the one or more domain classes identified by the identification engine 224. In an embodiment, the one or more domain specific language models 226 may be selected based on a probability that each of the one or more domain specific language models belongs to each of the one or more domain classes.

Upon being selected by the identification engine 224, the one or more domain specific language models 226 may generate the domain specific word. In an embodiment, the domain specific word may be generated based on the one or more acoustic features extracted by the ASR encoder 214.

Upon generation of the domain specific word, the ASR decoder 228 may decode the audio query. In an embodiment, the ASR decoder 228 may be configured to decode the audio query based on the generic word, and the domain specific word, and the one or more acoustic features. In an embodiment, decoding the audio query may result in generation of the at least one word related to the audio query.

The audio query may be decoded by the ASR decoder 228 based on a last predicted word associated with the ASR decoder 228, the generic word and the domain specific word. In response to receiving the last predicted word associated with the ASR decoder 228, the generic word and the domain specific word, the ASR decoder 228 may be configured to select the one or more high dimensional summary vectors comprising the audio vector for a word after the last predicted word.

The ASR decoder 228 may be configured to predict the at least one word associated with the audio query. In an embodiment, the at least one word may be based on the last predicted word, the generic word, the domain specific word, and the one or more high dimensional summary vectors associated with the audio vector. In an embodiment, the at least one word may be selected amongst one or more words based on a higher probability value. In an embodiment, the probability value may be based on a weight value associated with the generic language model, the domain specific language model and the ASR decoder.

In response to generation of the at least one word by the ASR decoder 228, the NLU engine 230 may process the at least one word. In an embodiment, the NLU engine 230 may be configured to process the at least one word for determining an operation to be executed with respect to the audio query received at the ASR encoder 214.

Figure 3:
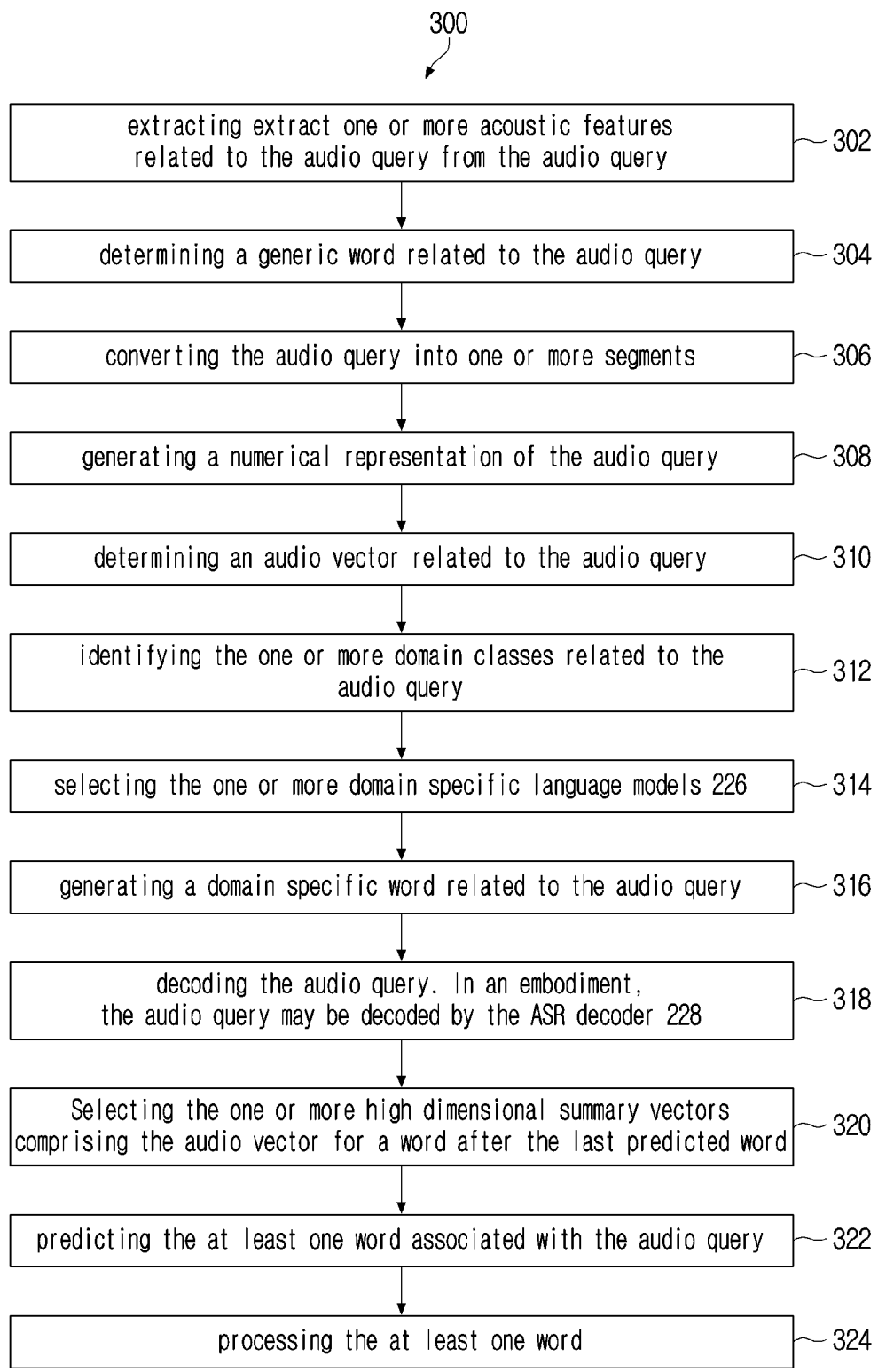
FIG. 3 illustrates an operational flow diagram depicting a process for decoding an audio query, in accordance with an embodiment of the present disclosure.

FIG. 3 is a flow chart illustrating a method 300 for decoding an audio query, in accordance with an embodiment of the present disclosure. In an embodiment, the audio query may be decoded by the system 102 as shown in FIGS. 1 and 2. In an embodiment, upon decoding the audio query, the system 102 may perform an operation to execute the audio query. In an embodiment, executing the audio query may be based on processing at least one word decoded from the audio query. In an embodiment, processing the at least one word may be based on a NLU technique. Furthermore, decoding the audio query to generate the at least one word may be based on a single pass ASR technique. In an embodiment, the audio query may be received from a user at the ASR encoder 214 as shown in FIG. 2.

The method 300 may include operation 302 of extracting one or more acoustic features related to the audio query from the audio query. In an embodiment, the one or more acoustic features may be extracted upon receiving the audio query by the system 102. In an embodiment, the one or more acoustic features may be extracted by the ASR encoder 214.

The method 300 may include operation 304 of determining a generic word related to the audio query. In an embodiment, the generic word may be determined based on the one or more acoustic features extracted from the audio query. In an embodiment, the generic word may be extracted by the generic language model 216 as shown in FIG. 2.

The method 300 may include operation 306 of converting the audio query into one or more segments. In an embodiment, the audio query may be converted into the one or more segments for representing the audio query as one or more numbers per segment. In an embodiment, the audio query may be converted into the one or more segments by the conversion engine 218 as shown in FIG. 2. In an embodiment, each of the one or more segments may be of 10 ms. In an exemplary embodiment, the audio query may be represented as 40 numbers per segments. In an embodiment, the conversion may be performed based on a Mel Frequency Cepstral Coefficient (MFCC) technique.

The method 300 may include operation 308 of generating a numerical representation of the audio query. In an embodiment, generating the numerical representation may be based on processing the one or more segments. In an embodiment, processing the one or more segments may include combining the one or more segments. In an embodiment, the numerical representation may be generated by the plurality of LSTM architectures 220 as shown in FIG. 2. Furthermore, the process may include generating one or more high dimensional summary vectors in a textual domain based on combining the one or more segments.

In an embodiment, the one or more high dimensional summary vectors may be treated as the numerical representation of the audio query. In an embodiment, the plurality of LSTMs 220 may be a part of a neural network such that the generation of the numerical representation may be based on the neural network employed by the system 102. In an embodiment, each high dimensional summary vector amongst the one or more high dimensional summary vectors may consists of 2048 dimensions and a textual summary of at least one of the one or more segments related to the audio query. In an embodiment, the one or more high dimensional summary vectors, and the one or more segments may be the one or more acoustic features related to the audio query. In an embodiment, the plurality of LSTMs 220 may be configured to be applied on the numerical representation related to each of the one or more segments.

In an embodiment, the method 300 may include operation 310 of determining an audio vector related to the audio query. In an embodiment, the audio vector may be determined by the determining engine 222 as referred in FIG. 2. In an embodiment, the audio vector may be determined from the one or more high dimensional summary vectors. In an embodiment, the audio vector may correspond to or may be obtained based on an average of the one or more high dimensional summary vectors so as to generate a summary related to the audio query. In an embodiment, the audio vector may be related to the one or more domain classes.

The method 300 may include operation 312 of identifying the one or more domain classes related to the audio query. In an embodiment, identifying the one or more domain classes may be based on extracting relevant information from the audio vector associated with the audio query. In an embodiment, the one or more domain classes may be stored in the memory 204 as the data 206 as referred in FIG. 2. In an embodiment, the one or more domain classes may be determined by the identification engine 224 as referred in FIG. 2.

The method 300 may include operation 314 of selecting the one or more domain specific language models 226. In an embodiment, the one or more domain specific language models 226 may be selected from the memory 204 for generating a domain specific word. In an embodiment, the one domain specific language models 226 may be selected based on the one or more domain classes identified by the identification engine 224. In an embodiment, the one or more domain specific language models 226 may be selected based on a probability of each of the one or more domain specific language models being related to each of the one or more domain classes. In an embodiment, the one or more domain specific models may be selected by the identification engine 224.

The method 300 may include operation 316 of generating a domain specific word related to the audio query. In an embodiment, the domain specific word may be generated based on the one or more acoustic features extracted by the ASR encoder 214 from the audio query. In an embodiment, the domain specific word may be generated by the one or more domain specific language models 226.

The method 300 may include operation 318 of decoding the audio query. In an embodiment, the audio query may be decoded by the ASR decoder 228 as referred in FIG. 2. In an embodiment, the audio query may be decoded by the ASR decoder 228 based on the generic word, the domain specific word, and the one or more acoustic features. In an embodiment, decoding the audio query may result in generation of the at least one word related to the audio query. The audio query may be decoded by the ASR decoder 228 may be based on a last predicted word associated with the ASR decoder 228, the generic word and the domain specific word.

The method 300 may include operation 320 of selecting the one or more high dimensional summary vectors comprising the audio vector for a word after the last predicted word. In an embodiment, the one or more high dimensional summary vectors may be selected by the ASR decoder 228. In an embodiment, the one or more high dimensional summary vectors may be selected based on determining by the ASR decoder 228 that the one or more high dimensional summary vectors include a summary associated with a word coming after the last precited word.

The method 300 may include operation 322 of predicting the at least one word associated with the audio query. In an embodiment, the prediction may be performed by the ASR decoder 228. In an embodiment, the at least one word may be acquired based on the last predicted word, the generic word, the domain specific word, and the one or more high dimensional summary vectors associated with the audio vector.

In an embodiment, the at least one word may be selected amongst one or more words based on a higher probability value. In an embodiment, the probability value may be based on a weight value associated with the generic language model, the domain specific language model and the ASR decoder 228. In an embodiment, predicting the at least one word by the ASR decoder 228 may be based on a deep learning technique. In an embodiment, the at least one word may be predicted based on a Recurrent Neural Network (RNN) technique such that the ASR decoder 228 may be based on the RNN.

The method 300 may include operation 324 of processing the at least one word. In an embodiment, the at least one word may be processed by the NLU engine 230 as referred in FIG. 2. In an embodiment, the NLU engine 230 may determine an operation to be executed with respect to the audio query received at the ASR encoder 214.

Figure 4:
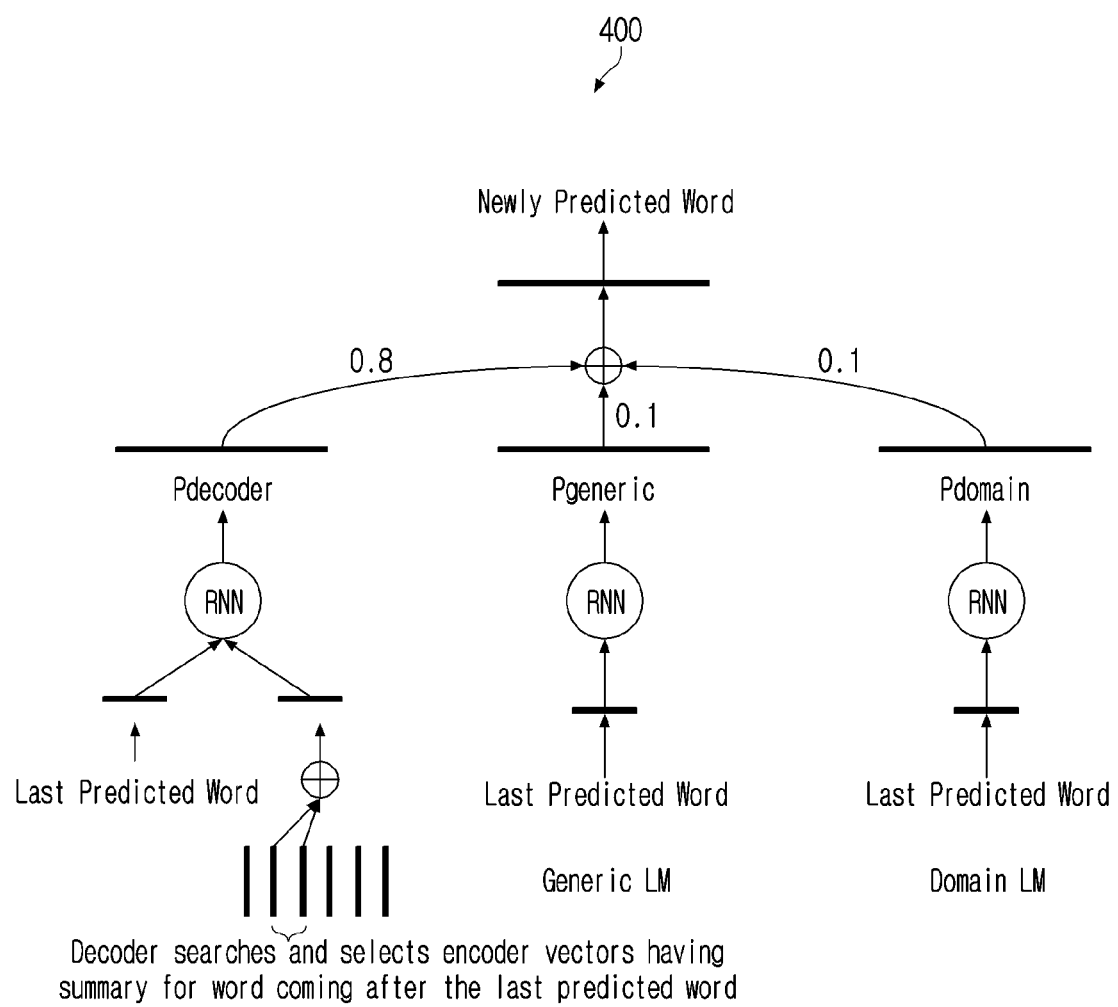
FIG. 4 illustrates an operational flow diagram depicting a process for a fusion of language models with an ASR decoder, in accordance with an embodiment of the present disclosure.

FIG. 4 illustrates an operational flow diagram 400 depicting a process for a fusion of language models with the ASR decoder 214, in accordance with an embodiment of the present disclosure. In an embodiment, the language models may include the generic language model 216 and the one or more domain specific language models 226. In an embodiment, the fusion of the generic language model 216 and the one or more domain specific language models 226 and the ASR decoder 228 may result in generation of at least one word based on an audio query as received by the ASR encoder 214.

In an embodiment, the ASR decoder 228 may be configured to select the one or more high dimensional summary vectors. In an embodiment, the one or more high dimensional summary vectors may be selected based on determining by the ASR decoder 228 that the one or more high dimensional summary vectors include a summary associated with a word coming after the last predicted word. In an embodiment, the ASR decoder 228 may be configured to fetch a last predicted word for generating the at least one word. Furthermore, a generic word and a domain specific word may be received from the generic language model 216 and the one or more domain specific language models 226.

Moving forward, the fusion may include determining the at least one word from one or more words based on a higher probability value. In an embodiment, the probability value may be based on a weight value associated with the generic language model 216, the domain specific language model 226 and the ASR decoder 228. In an embodiment, one or more domain classes of the audio query identified by the identification engine 224 may be used to select the one or more domain specific language models 226 to be used for the fusion.

In an embodiment, the at least one word may be predicted by the ASR decoder 228 based on a deep learning technique. In an embodiment, the at least one word may be predicted based on a Recurrent Neural Network (RNN) technique such that the ASR decoder 228 may be based on the RNN.

Figure 5:
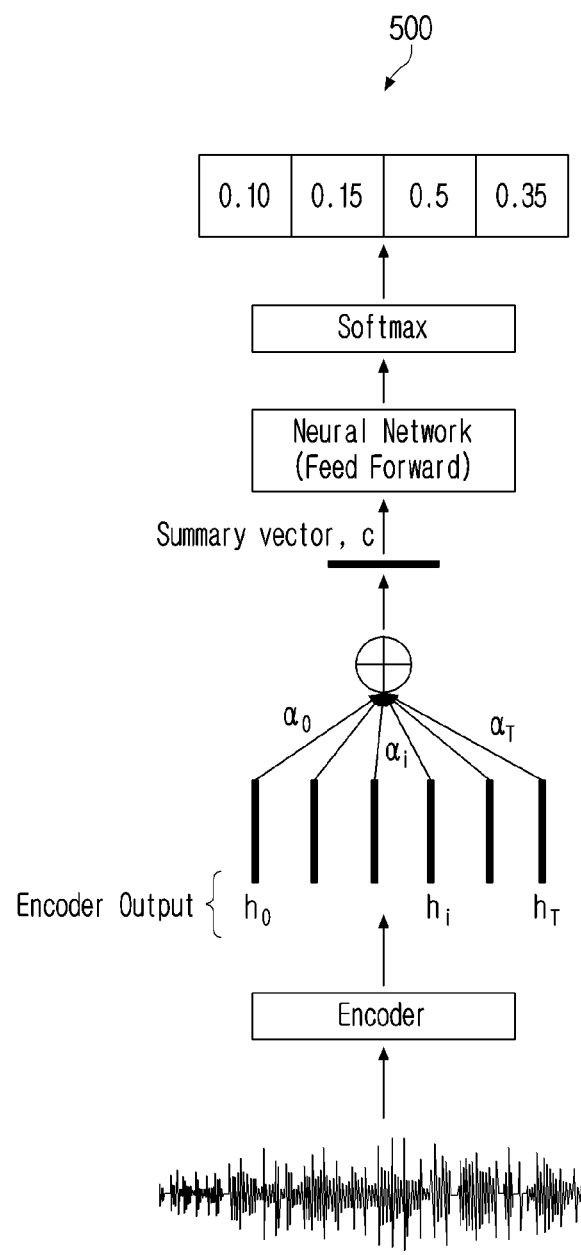
FIG. 5 illustrates an operation flow diagram depicting a process for decoding an audio query from one or more acoustic features, in accordance with an embodiment of the present disclosure.

FIG. 5 illustrates an operation flow diagram 500 depicting a process for decoding an audio query from one or more acoustic features, in accordance with an embodiment of the present disclosure. In an embodiment, the decoding may be performed by the system 102 as referred in FIG. 2. In an embodiment, the ASR encoder 214 may include stacked LSTM architectures, pyramidal LSTM (pLSTM) architectures, Bi-LSTM architectures and an embedding layer. Furthermore, the identification engine 224 may include an attention layer followed by a Feed Forward Network (FFN) and a softmax for domain-classification.

In an embodiment, the FFN may provide a non-linear projection of summary vector in a fixed size latent space. In an embodiment, an argmax of a probability distribution may be a predicted class for the audio query.

Furthermore, the softmax may be configured to calculate a probability P(d) of the audio query belonging to each of one or more domain classes. In an embodiment, the FFN may extract relevant information from a context vector associated with the audio query. Moving ahead, the attention layer may be configured to calculate a weighted sum of one or more high dimensional summary vectors to fetch summary of the audio query.

$$P(d) = \text{Softmax}(f\!f)$$

$$FF(c) = f\!f = \text{ReLU}(W_j c + b_f)$$

$$\text{Attention } (h) = c = \sum_{i=1}^{T'} \alpha_i h_i$$

$$\alpha_i = \frac{\exp(e_i)}{\sum_{k=1}^{T'} \exp(e_k)}$$

$$e_i = V^T \tanh(W_e h_i + b_e)$$

In an embodiment, P(d) may refer to softmax function. The softmax function may return the probability of each class. FF(c) may refer to Feed-Forward layer. This layer may help in learning non-linear relations in the data. VT, We, be may refer to weight matrices to be learned for the alignment model.

In an embodiment, αi may normalize the attention weights between 0 and 1. ei may calculate contribution of an encoder output hi. In an embodiment, hi may be an encoder hidden state containing information about several time steps of the audio query.

Figure 6:
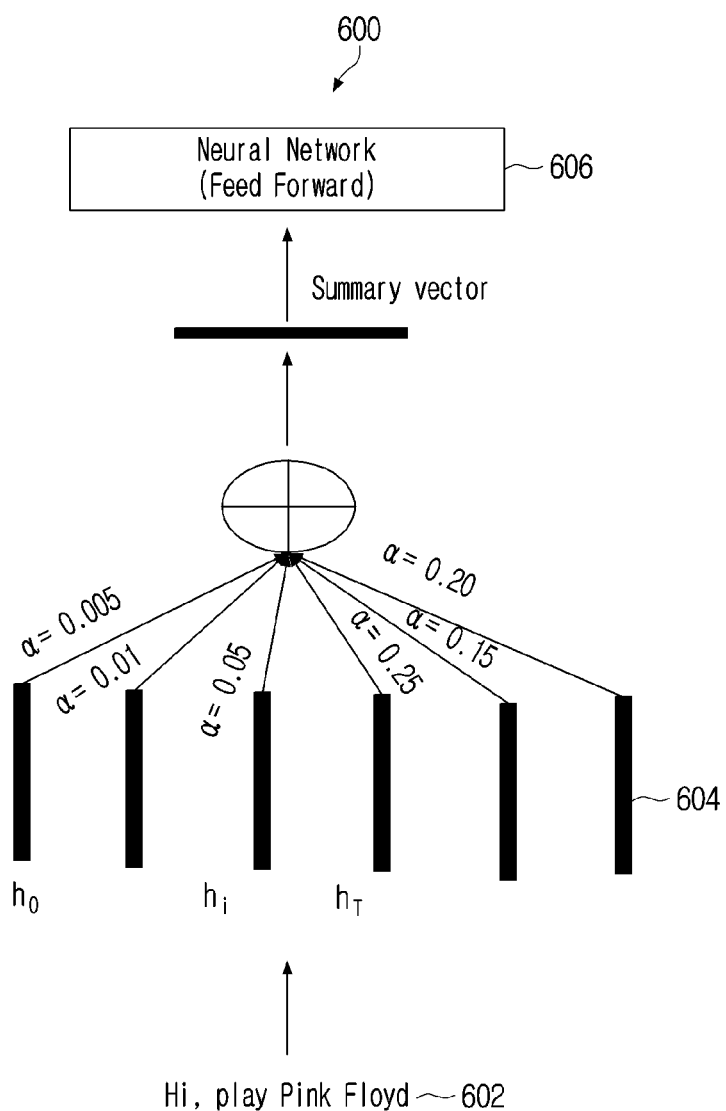
FIG. 6 illustrates an use case diagram depicting a single pass ASR decoding with domain identification, in accordance with an embodiment of the presents disclosure.

FIG. 6 illustrates an use case diagram 600 depicting a single pass ASR decoding with domain identification, in accordance with an embodiment of the presents disclosure.

At step 602, a command "Hi, play pink floyd" is received from a user. In an embodiment, audio features associated with the command may be passed through an encoder network.

Furthermore, at step 604, an attention calculates a weighted sum of hidden states to obtain a summary vector of a complete input audio. The summary vector is a weighted sum of the hidden states of an encoder based on the weights. In an exemplary embodiment, the hidden states corresponding to "play", "Pink" & "Floyd" may be more prominent in comparison to other hidden states. Each encoder hidden state hi contains information about several time-steps of audio. The hidden states carrying more information for domain identification are given larger weights in calculation of the summary vector. In an exemplary embodiment, "hi" associated with "play", "Pink" & "Floyd" may include scores 0.25, 0.15 and 0.20.

At step 606, a FFN provides a non-linear projection of the summary vector in a fixed size latent space for better generalization. The on-linear projection may be used by a softmax layer to calculate probability scores for multiple domains.

Figure 7A:
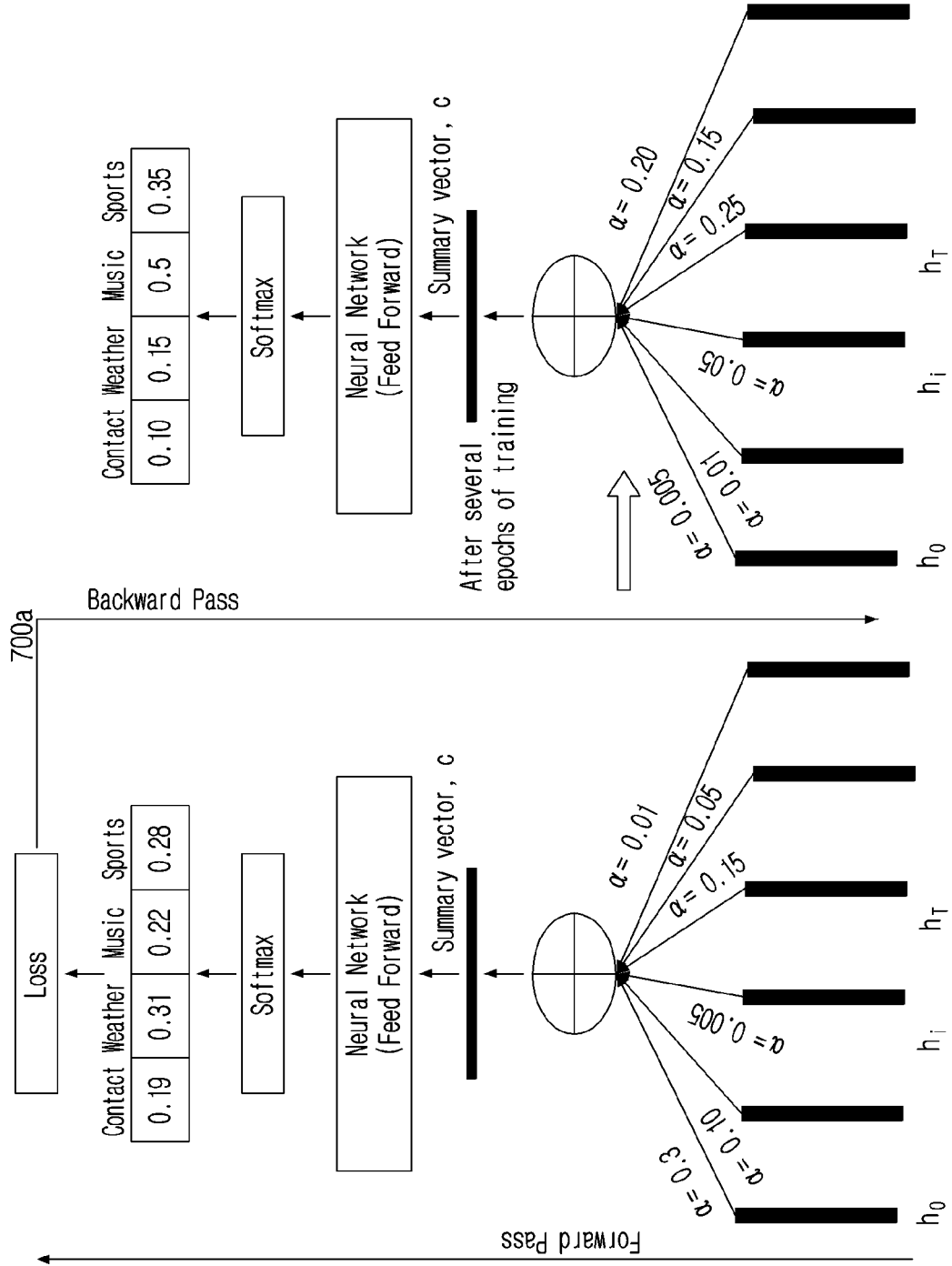
FIG. 7A illustrates a use case diagram depicting a process for a domain classification from encoder features, in accordance with an embodiment of the present disclosure.

FIG. 7A illustrates a use case diagram 700a depicting a process for a domain classification from encoder features, in accordance with an embodiment of the present disclosure. In an embodiment, the process may include a forward pass related to an initial training stage and a backward pass related to an after training stage. In an embodiment, in the forward pass, input data is fed (step 702a) in a forward direction to a network and a loss is calculated by comparing a network output and expected output values. In an embodiment, a loss (e.g., a cross entropy loss) may be calculated by comparing a model prediction and an expected value after every forward pass. In an embodiment, the network may be a FFN. In an exemplary embodiment, the network may incorrectly assign a highest domain score to weather while correct expected domain is music in initial training steps.

In an embodiment, training data may include a number of utterances per domain. In an exemplary embodiment, a music domain may include utterances such as "play {song} {album}" with one or more songs and album names. During a training stage the network may learn to assign more weightage to audio time-steps for the keywords. Further, a summary vector may act as a representative of the keywords more than representing all audio parts equally.

In an embodiment, parameters V and We may be learned by the training process along with a parameter related to the Feed Forward Layer.

$$\alpha_i = \frac{\exp(e_i)}{\sum_{k=1}^{T'} \exp(e_k)}$$

$$e_i = V^T \tanh(W_e h_i + b_e)$$

energy term is normalized to get scores/contribution, $\alpha i$ from each encoder output hi ei is the energy term associated with each encoder output hi, ei values calculated depend on values of the parameters V and We at a certain stage of training. $\alpha I$ values may depend on directly ei values and indirectly on the V and the We values at a particular training stage.

Upon initiation of the training, the model parameters including the V and We may be randomly initialized. The model may be configured to determine the forward pass predictions based on randomly assigned values in initial training stages.

In a backward pass, model parameters may be updated (step 704a) based on the loss calculated at the step 702a. After a number of training steps, the network may learn to predict domains with a higher accuracy. In the backward pass, each model parameter such as "w" may be updated based on an equation:

$$w_{new} = w_{old} - \text{lr}(\delta(J(w)))$$

J(w)=Loss.

$\delta(J(w)) = (\delta L/\delta w)$, derivative of the loss with respect to the parameter w.

lr: Learning rate parameter.

In each backward pass, "w" may be adjusted based on a sign and value of a gradient.

Figure 7B:
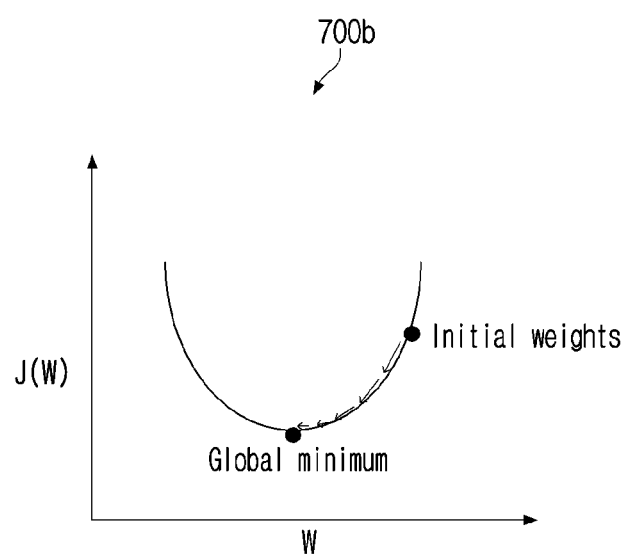
FIG. 7B illustrates a graphical representation depicting values of model parameters, in accordance with an embodiment of the present disclosure.

FIG. 7B illustrates a graphical representation 700 depicting values of model parameters, in accordance with an embodiment of the present disclosure. In an embodiment, upon a convergence of a model training, the model parameters may be at an optimal value to minimize an overall loss. In an embodiment, model may be one or more domain specific language models.

Figure 8:
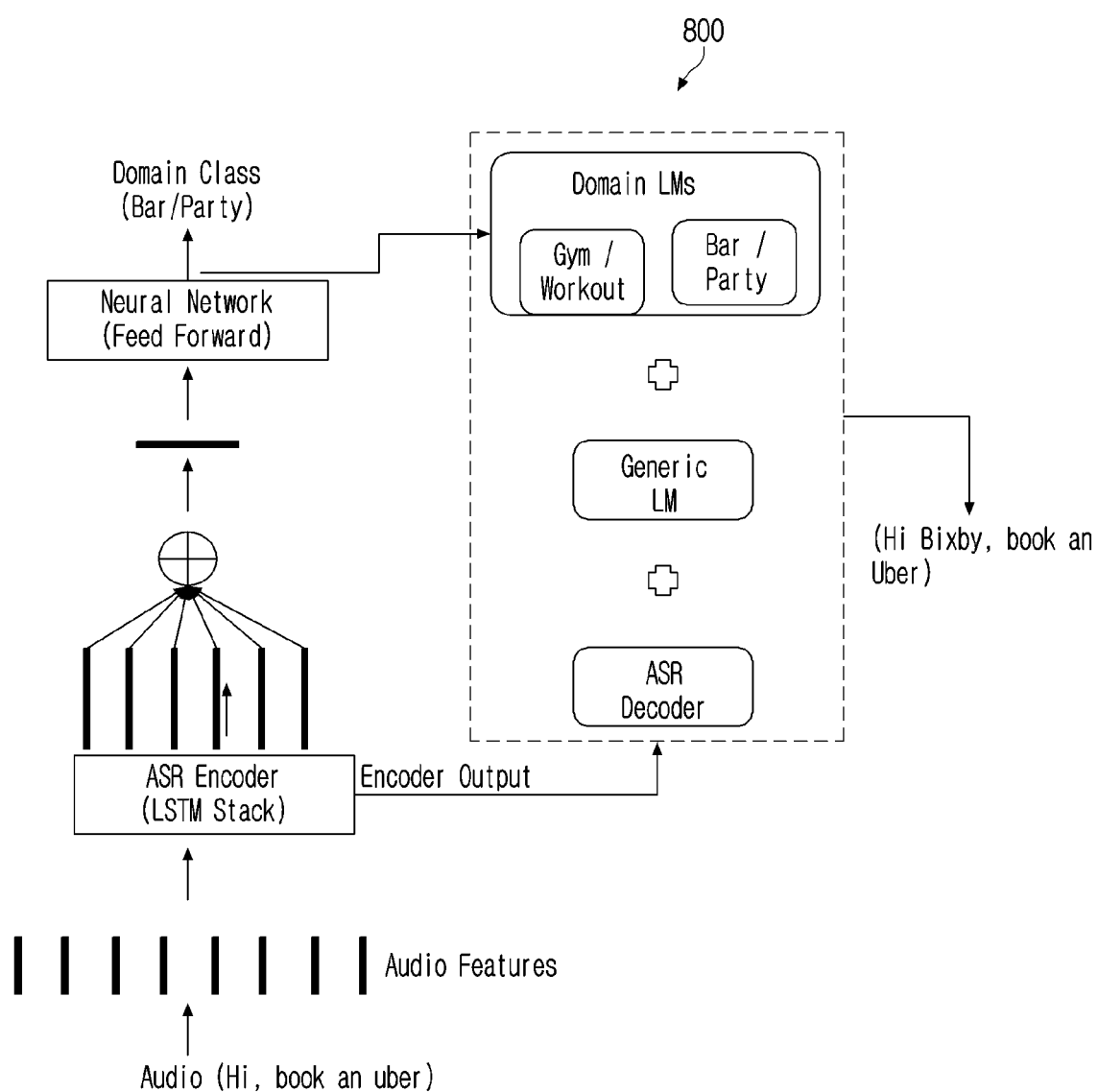
FIG. 8 illustrates a use case diagram depicting a process for classifying one or more domain specific language models in a noisy environment, in accordance with an embodiment of the present disclosure.

FIG. 8 illustrates a use case diagram 800 depicting a process for classifying one or more domain specific language models in a noisy environment, in accordance with an embodiment of the present disclosure. In an embodiment, the one or more domain specific language models may be classified by the system 102 as referred in FIG. 1. In an embodiment, upon receiving an audio query, one or more voice characteristics and one or more environment acoustics in the audio query may be utilized to identify the one or more domain specific language models based on single pass decoding. In an embodiment, the audio query may be "Hi, book an uber".

In an embodiment, a final output may be received based on an encoder output and one or more domain classes. In an embodiment, the encoder output may be generated by the ASR encoder 214 as referred in FIG. 2.

Figure 9:
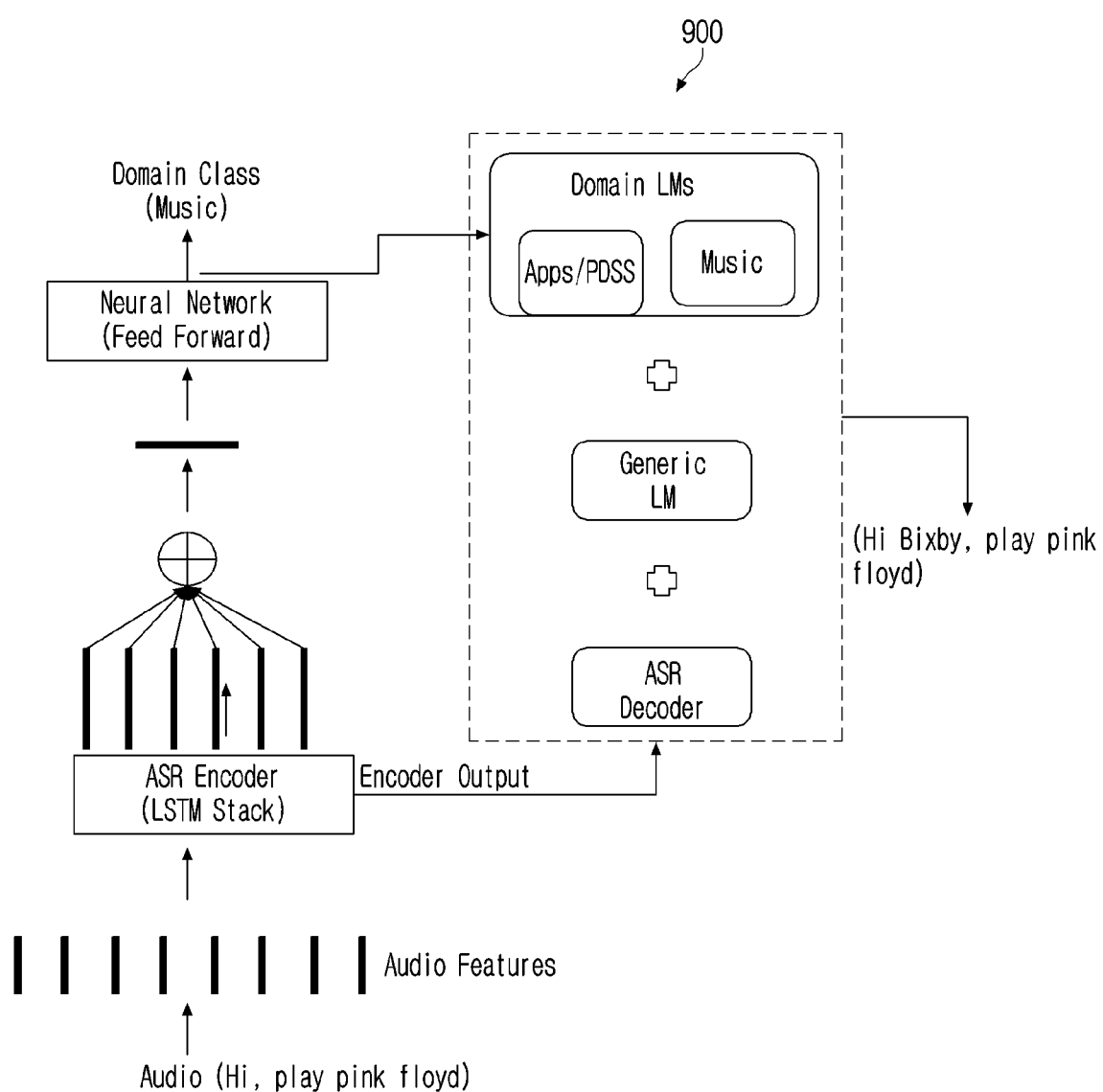
FIG. 9 illustrates a use case diagram depicting a robustness with one or more accent of a user of in single pass decoding, in accordance with an embodiment of the present disclosure.

FIG. 9 illustrates a use case diagram 900 depicting a robustness with one or more accent of a user of in single pass decoding, in accordance with an embodiment of the present disclosure. In an embodiment, identifying one or more domain specific language models directly from an encoder output for a model trained on a multi-accented data may not include one or more errors introduced during a decoding phase of an audio query received from a user. In an embodiment, a final output may be received based on an encoder output and one or more domain classes. In an embodiment, the encoder output may be generated by the ASR encoder 214 as referred in FIG. 2. In an embodiment, the audio query may be "Hi, please play pink floyd?

In an embodiment, one or more domain specific language models identified from the audio query may assign a weight to encoder outputs corresponding to the one or more of the missing audio chunk and the weak audio chunk in addition to the remaining encoder outputs.

Figure 10:
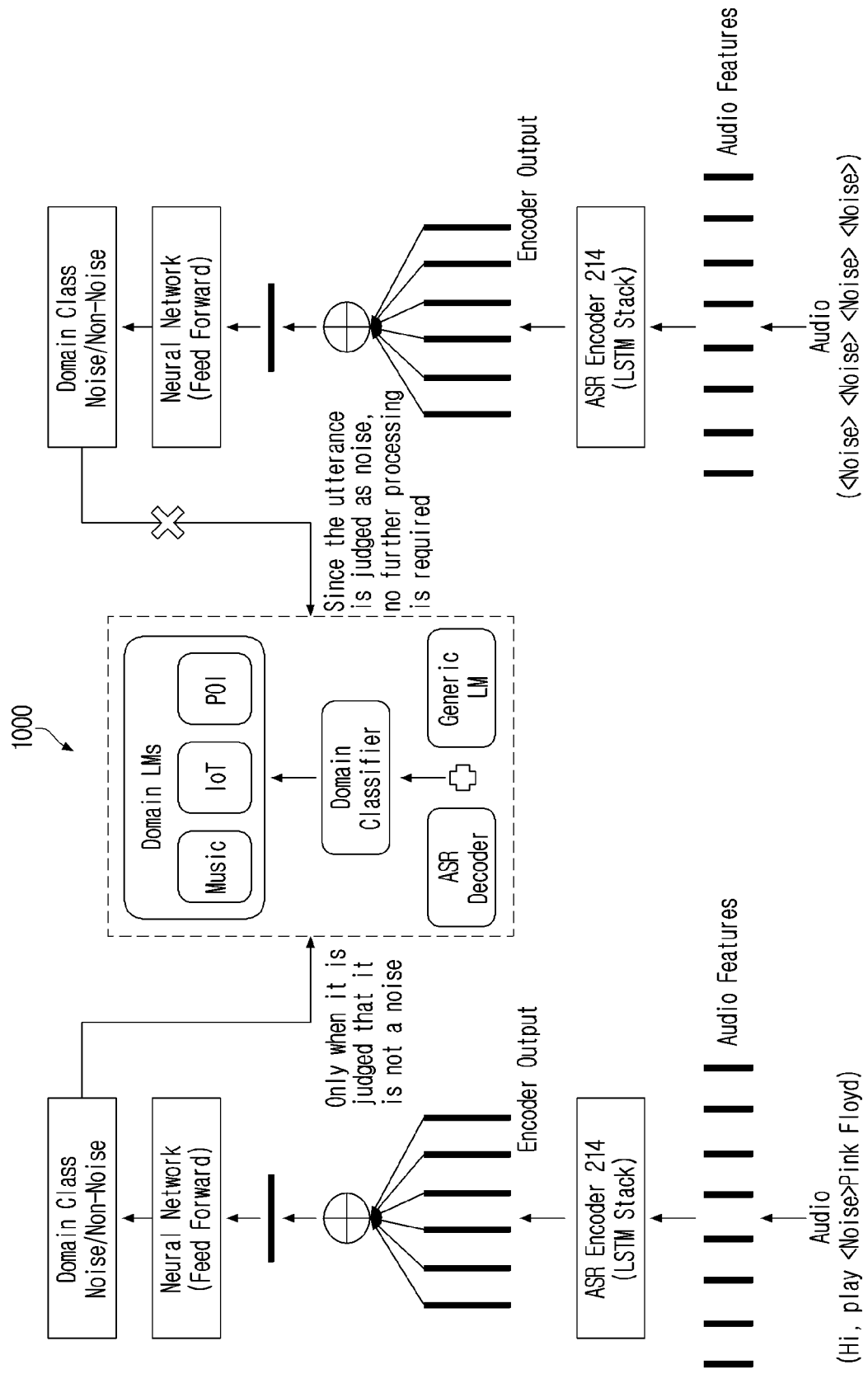
FIG. 10 illustrates a use case diagram depicting a process for cancelling noise in an audio query, in accordance with an embodiment of the present disclosure.

FIG. 10 illustrates a use case diagram 1000 depicting a process for cancelling noise in an audio query, in accordance with an embodiment of the present disclosure. In an embodiment, an encoder output is generated by the ASR recorder 214 as referred in FIG. 2 from the audio query. Furthermore, the noise may be identified by a domain class associated with the noise. In an embodiment, where it is determined that the noise is not identified, the one or more domain specific language models may be determined to generate a final output. In an embodiment, where it is determined that the noise is identified, the one or more domain specific language models may not be determined to generate a final output.

Figure 11:
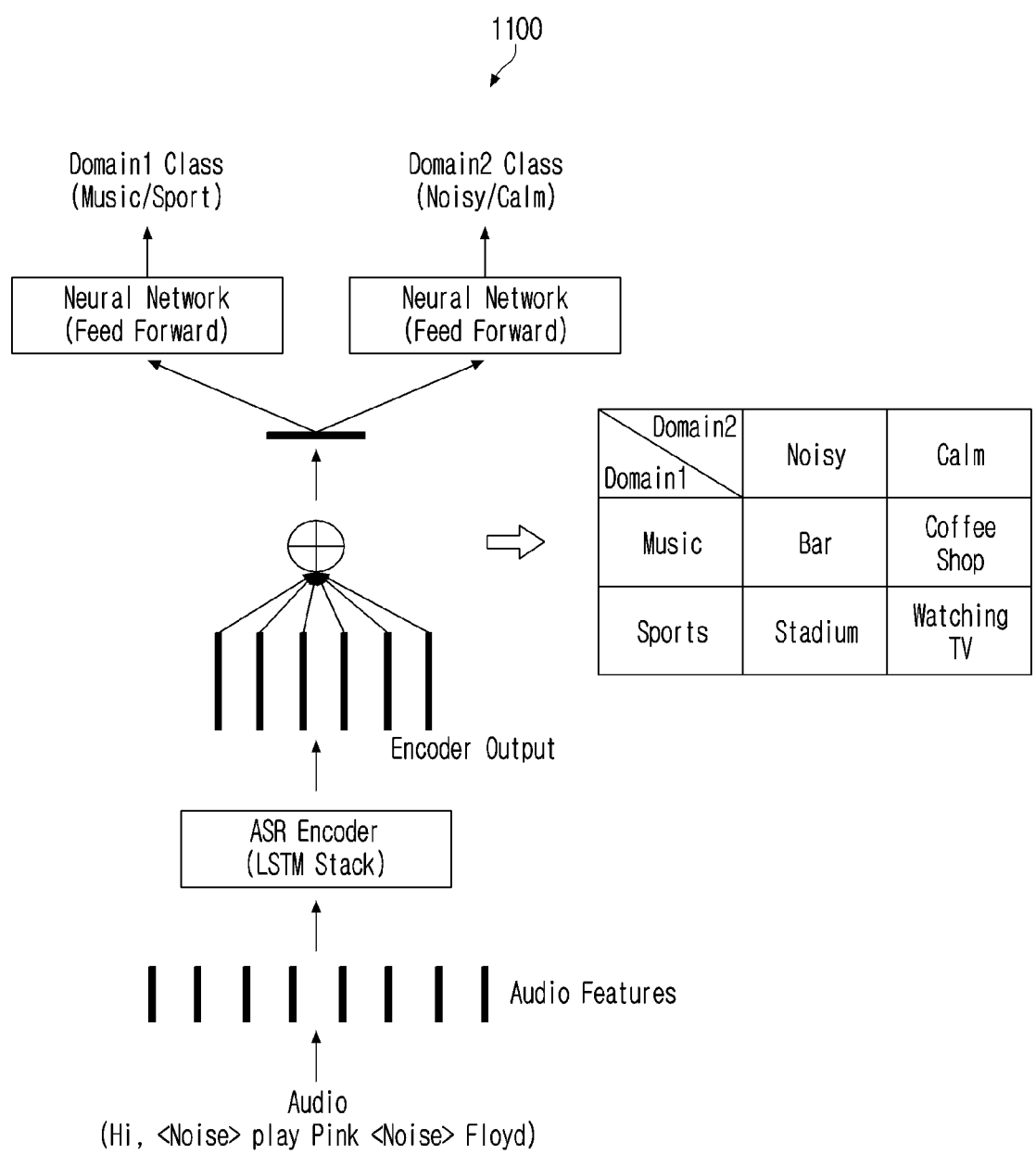
FIG. 11 illustrates a use case diagram depicting an environmental analysis by using two domain classes, in accordance with an embodiment of the present disclosure.

FIG. 11 illustrates a use case diagram 1100 depicting an environmental analysis by using two domain classes (e.g., a first class indicating a noise level, and a second class indicating an entertainment content category), in accordance with an embodiment of the present disclosure. In an embodiment, an encoder output is generated by the ASR recorder 214 as referred in FIG. 2 from an audio query. Furthermore, based on the encoder output, the two domain classes may be identified to further analyze the environment associated with a user uttering the audio query.

Figure 12:
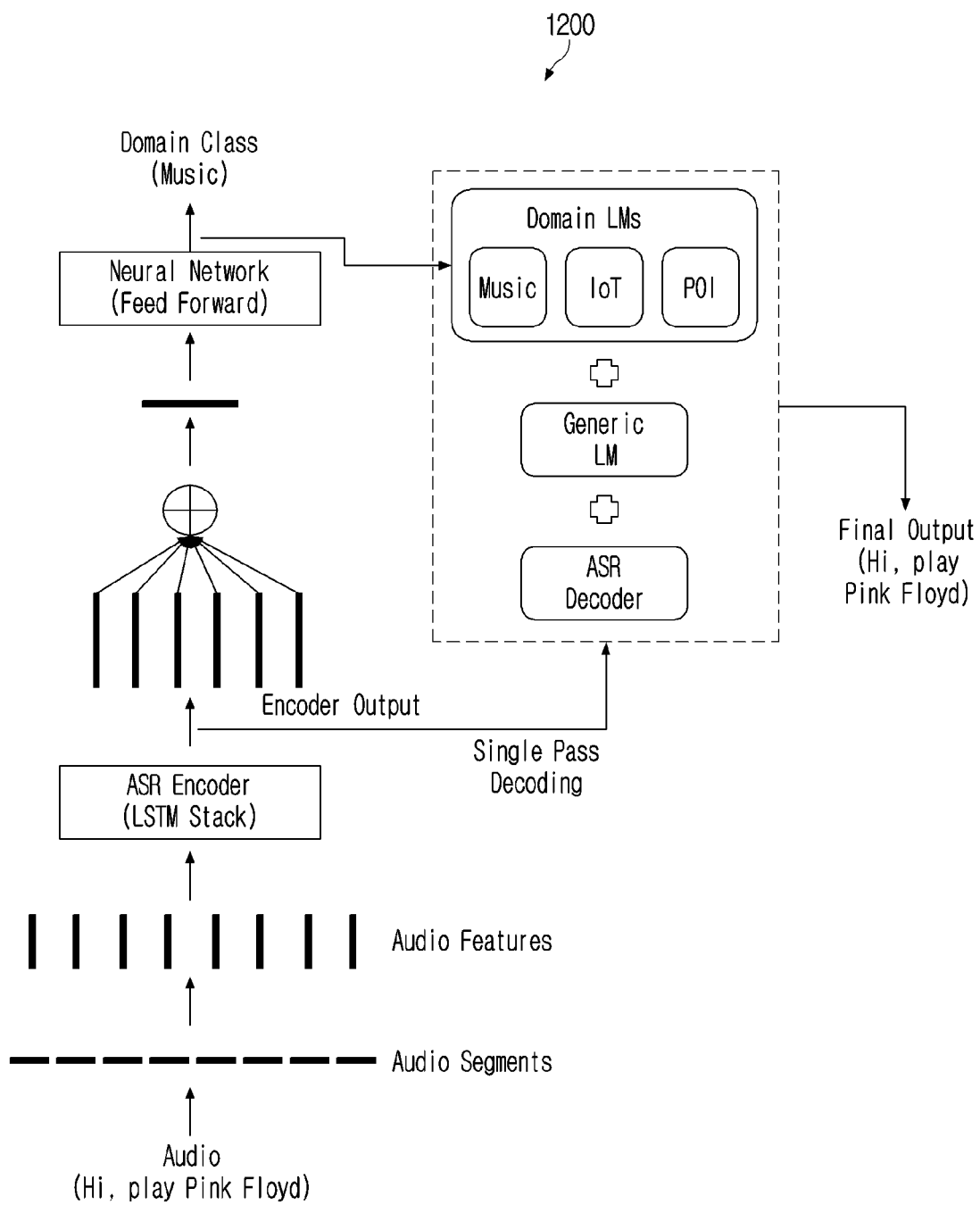
FIG. 12 illustrates a use case diagram depicting an accuracy improvement with a domain language model in a single pass, in accordance with an embodiment of the present disclosure.

FIG. 12 illustrates a use case diagram 1200 depicting an accuracy improvement with a domain language model in a single pass, in accordance with an embodiment of the present disclosure. In an embodiment, an encoder output is generated by the ASR recorder 214 as referred in FIG. 2 from an audio query. In an embodiment, presence of domain language models in a first pass may prevent a generic language model from biasing a hypothesis to irrecoverable form. The domain language models may include a first domain language model corresponding to a music domain, a second domain language model corresponding to an IoT domain, and a third domain language model corresponding to a point of interest (PoI) domain.

Furthermore, in an embodiment, a domain detection may not depend on an intermediate text hypothesis. An augmentation method in training may increase robustness to noisy scenarios.

FIG. 13 is a flowchart illustrating a method 1300 for depicting a method for decoding an audio query, in accordance with embodiment of the present disclosure. The method 600 shown in FIG. 6 may be implemented by the system 102 using components thereof, as described above. In an embodiment, the method 1300 shown in FIG. 13 may be executed by the ASR encoder, 214, the generic language model 216, the conversion engine 218, the plurality of LSTM architectures 220, the determining engine 222, the identification engine 224, the one or more domain specific language models 226, the ASR decoder 228, and the NLU engine 230. Further, for the sake of brevity, details of the present disclosure that are explained in details in the description of FIG. 1 to FIG. 12 are not explained in detail in the description of FIG. 13.

According to an embodiment of the present disclosure, the method 1300 includes operation 1302 of extracting, by an Automatic Speech Recognition (ASR) encoder, one or more acoustic features associated with the audio query in response to receiving the audio query.

The method 1300 may include operation 1304 of determining, by a generic language model, a generic word based on the one or more acoustic features.

Further, the method 1300 includes operation 1306 of determining, by one or more domain specific language models, a domain specific word based on the one or more acoustic features, wherein the one or more domain specific language models is selected upon identifying one or more domain classes associated with the one or more domain specific language models.

Furthermore, the method 1300 includes operation 1308 of decoding, by an ASR decoder, the audio query based on the generic word, and the domain specific word, and the one or more acoustic features resulting in generation of at least one word associated with the audio query.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for decoding an audio query, the method comprising:
    extracting one or more acoustic features from the audio query in response to receiving the audio query from a user;
    identifying at least one domain class based on the audio query using an attention layer of a neural network model;
    determining a generic word and a domain specific word based on the one or more acoustic features by inputting the one or more acoustic features to a generic language model configured to generate the generic word understood without specific domain knowledge, and inputting the one or more acoustic features to a domain specific language model configured to generate the domain specific word within a specific knowledge domain, wherein the domain specific language model corresponds to the identified at least one domain class; and
    decoding the audio query based on the generic word, the domain specific word, and the one or more acoustic features to identify at least one word associated with the audio query,
    wherein the attention layer is followed by a feed forward network configured to provide a non-linear projection of a summary vector of the audio query in a fixed size latent space.

2. The method as claimed in claim 1, further comprising:
    obtaining a weighted sum of vectors representing the generic word, the domain specific word, and the one or more acoustic features processed through an automatic speech recognition (ASR) decoder; and identifying the at least one word associated with the audio query based on the weighted sum of the vectors.

3. The method as claimed in claim 1, wherein the identifying the at least one domain class comprises:
converting the audio query into one or more segments to represent the audio query as one or more numbers per segment;
generating one or more summary vectors in a textual domain by combining the one or more segments, wherein the one or more summary vectors are numerical representations of the audio query;
determining an audio vector associated with the audio query from the one or more summary vectors; and
identifying the at least one domain class associated with the audio query based on the audio vector associated with the audio query.

4. The method as claimed in claim 1, wherein the generic word and the domain specific word are determined in parallel.

5. The method as claimed in claim 1, wherein the decoding the audio query comprises:
receiving a last predicted word associated with an automatic speech recognition (ASR) decoder, the generic word and the domain specific word;
selecting one or more summary vectors comprising an audio vector for a word that follows the last predicted word; and
predicting the at least one word associated with the audio query based on the last predicted word, the generic word, the domain specific word, and the one or more summary vectors associated with the audio vector.

6. The method as claimed in claim 1, further comprising:
identifying, from a plurality of words, the at least one word that has a probability value higher than probabilities values of other words, wherein the probability value is determined based on a weight value associated with the generic language model, the domain specific language model, and an automatic speech recognition (ASR) decoder that performs the decoding of the audio query.

7. The method as claimed in claim 1, further comprising:
selecting the domain specific language model among a plurality of domain specific language models based on a probability of each of the plurality of domain specific language models being related to each of a plurality of domain classes,
wherein the determining the domain specific word comprises:
determining the domain specific word using the selected domain specific language model.

8. An electronic device for decoding an audio query, the electronic device comprising:
a memory storing one or more instructions; and
at least one processor configured to execute the one or more instructions to:
extract one or more acoustic features from the audio query in response to receiving the audio query from a user;
identify at least one domain class based on the audio query using an attention layer of a neural network model;
determine a generic word and a domain specific word based on the one or more acoustic features by inputting the one or more acoustic features to a generic language model configured to generate the generic word understood without specific domain knowledge, and inputting the one or more acoustic features to a domain specific language model configured to generate the domain specific word within a specific knowledge domain, wherein the domain specific language model corresponds to the identified at least one domain class; and
decode the audio query based on the generic word, the domain specific word, and the one or more acoustic features to identify at least one word associated with the audio query,
wherein the attention layer is followed by a feed forward network configured to provide a non-linear projection of a summary vector of the audio query in a fixed size latent space.

9. The electronic device as claimed in claim 8, wherein the at least one processor is further configured to execute the one or more instructions to:
obtain a weighted sum of vectors representing the generic word, the domain specific word, and the one or more acoustic features processed through an automatic speech recognition (ASR) decoder; and identify the at least one word associated with the audio query based on the weighted sum of the vectors.

10. The electronic device as claimed in claim 8, wherein the at least one processor is further configured to execute the one or more instructions to:
convert the audio query into one or more segments to represent the audio query as one or more numbers per segment;
one or more summary vectors in a textual domain by combining the one or more segments via a plurality of Long Short-Term Memory (LSTM) architectures, wherein the one or more summary vectors are numerical representations of the audio query;
determining an audio vector associated with the audio query from the one or more summary vectors; and
identifying the at least one domain class associated with the audio query based on the audio vector associated with the audio query.

11. The electronic device as claimed in claim 8, wherein the at least one processor is further configured to execute the one or more instructions to:
determine the generic word and the domain specific word in parallel.

12. The electronic device as claimed in claim 8, wherein the at least one processor is further configured to execute the one or more instructions to:
receive a last predicted word associated with an automatic speech recognition (ASR) decoder, the generic word and the domain specific word;
select one or more summary vectors comprising an audio vector for a word that follows the last predicted word; and
predict the at least one word associated with the audio query based on the last predicted word, the generic word, the domain specific word, and the one or more summary vectors associated with the audio vector.

13. The electronic device as claimed in claim 8, wherein the at least one processor is further configured to execute the one or more instructions to:
identify, from a plurality of words, the at least one word that has a probability value higher than probabilities values of other words, wherein the probability value is determined based on a weight value associated with the generic language model, the domain specific language model, and an automatic speech recognition (ASR) decoder.

14. The electronic device as claimed in claim 8, wherein the at least one processor is further configured to execute the one or more instructions to:
- select the domain specific language model among a plurality of domain specific language models based on a probability of each of the plurality of domain specific language models being related to each of a plurality of domain classes; and
- determine the domain specific word using the selected domain specific language model.

15. A non-transitory computer-readable storage medium storing a program that is executable by at least one processor to perform a method for decoding an audio query, the method comprising:
- extracting one or more acoustic features from the audio query in response to receiving the audio query from a user;
- identifying at least one domain class based on the audio query using an attention layer of a neural network model;
- determining a generic word and a domain specific word based on the one or more acoustic features by inputting the one or more acoustic features to a generic language model configured to generate the generic word understood without specific domain knowledge, and inputting the one or more acoustic features to a domain specific language model configured to generate the domain specific word within a specific knowledge domain, wherein the domain specific language model corresponds to the identified at least one domain class; and
- decoding the audio query based on the generic word, the domain specific word, and the one or more acoustic features to identify at least one word associated with the audio query, wherein the attention layer is followed by a feed forward network configured to provide a non-linear projection of a summary vector of the audio query in a fixed size latent space.

16. A method for decoding an audio query, the method comprising:
- extracting one or more acoustic features from the audio query in response to receiving the audio query from a user;
- identifying at least one domain class based on the audio query using an attention layer of a neural network model by:
  - obtaining a summary vector of the audio query through the attention layer based on a weighted sum of hidden states of the audio query;
  - providing probability scores for multiple domains through a softmax layer based on a non-linear projection of the summary vector; and
  - identifying the at least one domain class from the multiple domains based on the probability scores,
- determining a generic word and a domain specific word based on the one or more acoustic features by inputting the one or more acoustic features to a generic language model configured to generate the generic word understood without specific domain knowledge, and inputting the one or more acoustic features to a domain specific language model configured to generate the domain specific word within a specific knowledge domain, wherein the domain specific language model corresponds to the identified at least one domain class; and
- decoding the audio query based on the generic word, the domain specific word, and the one or more acoustic features to identify at least one word associated with the audio query.

* * * * *